United States Patent [19]

Weasel, Jr.

[11] Patent Number: 4,467,612

[45] Date of Patent: Aug. 28, 1984

[54] REMOVABLE PALLET FLOOR FOR CHILLED VEGETATION TRANSPORT

[76] Inventor: George E. Weasel, Jr., 450 Australian Ave., Suite 503, West Palm Beach, Fla. 33401

[21] Appl. No.: 470,277

[22] Filed: Feb. 28, 1983

[51] Int. Cl.³ ............................................. F24F 3/16
[52] U.S. Cl. .......................................... 62/78; 62/91; 62/239; 62/373; 108/51.1; 108/52.1; 108/901; 426/524
[58] Field of Search .................... 62/239, 373, 78, 91; 108/51.1, 52.1, 901; 426/524

[56] References Cited

U.S. PATENT DOCUMENTS

| | | | |
|---|---|---|---|
| 2,751,882 | 6/1956 | Coyner | 62/64 |
| 3,058,709 | 10/1962 | Van Moss, Jr. et al. | 108/51.1 |
| 3,733,849 | 5/1973 | Cantagallo et al. | 62/239 |
| 3,910,203 | 10/1975 | Hamkins et al. | 108/51.1 |
| 3,951,078 | 4/1976 | Fowler et al. | 108/901 |

Primary Examiner—Ronald C. Capossela
Attorney, Agent, or Firm—Wendell Coffee

[57] ABSTRACT

A plurality of special pallets aligned end to end in two rows on the floor of an insulated transport container form a false floor with fluid conduits therebelow. Each of the special pallets is a single piece casting of plastic material with a thin solid top, three spaced-apart runners attached below the top, end braces attached to the pallet ends, and a horizontal reinforcing web supporting the top. Voids extending between the runners are aligned to form four fluid conduits from the front of the container to its rear. A pan or false ceiling is suspended from the container ceiling to form a sprinkler plenum between the pan and the ceiling. Chilled water is pumped into the sprinkler plenum, and sprinkled through regularly spaced holes in the pan onto vegetation stacked on the false floor. Water sprinkled onto the vegetation drains through slits in the pallet tops into the fluid conduits and flows therethrough to a drain at the rear of the container. Inert gas injected from a gas plenum through ports at the floor near the container front into the fluid conduits flows toward the rear, dispersing up through the slits and around the vegetation. The pallets are easily removed between loads for cleaning and sanitation of the pallets and the container floor.

17 Claims, 5 Drawing Figures

REMOVABLE PALLET FLOOR FOR CHILLED VEGETATION TRANSPORT

CROSS REFERENCE TO RELATED APPLICATIONS

Although this application is concerned with the same subject matter as my prior applications, Ser. No. 305,952, filed Sept. 28, 1981, and Ser. No. 439,919, filed Nov. 8, 1982, no claim to priority is made at this time.

BACKGROUND OF THE INVENTION (1) Field of the Invention

This invention relates to the preparation, transportation and storage of fresh vegetation.

(2) Description of the Prior Art

Commercial hydro-coolers have been in commercial operation for some time. In the hydro-coolers, harvested produce was loaded in crates or lugs and placed upon a conveyor. The loaded conveyor was moved into a chamber where chilled water was flushed over it to quickly reduce the temperature of the produce to the required shipping temperature. After the cooling process, it was also customary to move the produce out of the cooling chamber, either by hand or by fork lift, to move it through ambient atmosphere into a refrigerated truck, trailer or railroad car. Often this refrigerated truck, trailer or railroad car was not refrigerated at the time the produce was loaded into it. It may be seen that not only a certain amount of inefficiency took place because of the addition of heat to the produce, but also there would be an undesirable temperature fluctuation of the produce.

Before this invention, fresh harvested produce, such as radishes, had been loaded into trailers and chilled by a water flood. The water was flooded into the trailer by inserting water pipes through the open door of the trailer and leaving the doors open for the water to drain from the trailer after it had flushed the produce. After the produce was chilled, the normal atmosphere was purged from the trailer and from the produce by flooding the area with nitrogen gas as produced by liquid nitrogen. Thereafter, the trailer was closed as tightly as possible and sent to its destination. During transportation, conventional refrigeration units were provided to keep the contents as near as possible at 32° F.

Before this application was filed, applicant was aware of the following U.S. patents:
Johnson et al., U.S. Pat. No. 2,479,840
Coyner, U.S. Pat. No. 2,751,882
Ellis, U.S. Pat. No. 3,153,917
Dixon, U.S. Pat. No. 3,239,360
Dixon, U.S. Pat. No. 3,269,133
Dixon, U.S. Pat. No. 3,365,307
Snelling, U.S. Pat. No. 3,385,073
Lichtenberger et al., U.S. Pat. No. 3,421,336
Dixon, U.S. Pat. No. 3,487,769
Dixon, U.S. Pat. No. 3,563,757
Stowasser et al., U.S. Pat. No. 3,672,182
Rhoad, U.S. Pat. No. 3,961,925
Dixon, U.S. Pat. No. 3,962,477
Shaw, U.S. Pat. No. 4,307,580
Waters, U.S. Pat. No. 4,229,948.

Many of these patents are considered pertinent because the applicant believes the Examiner would consider anything revealed by any searches related to this subject matter to be relevant and pertinent to the examination of this application. However, it is noted that Ellis discloses removable individual planks with adjustable holes therein segregating an insulated trailer into a lower frozen food section and an upper fresh food section. Rhoad discloses a multilevel sprinkler pipe system for produce in individual trays, with sprayed water collected in a sump, chilled there, and recirculated. Coyner discloses a sprinkler pipe system for spraying misted water on animals.

SUMMARY OF THE INVENTION (1) New Functions and Surprising Results

I have invented pallets that are arranged on the floor of an insulated transport container to form a false floor with fluid conduits below the false floor, and long narrow slits through the false floor fluidly connecting the fluid conduits with the space above the false floor. A false ceiling of my invention is formed by a pan or planar sheet with holes or perforations therein to form a plenum between the ceiling of the container and the false ceiling for the distribution of water in substantial flow rates over vegetation in the container stacked on the false floor.

I use the term "vegetation" to include a wide variety of material. It will be understood, that fresh produce, such as vegetables or fruit, for example sweet corn, cantaloupes, or radishes are still "live". The fact that the produce has been severed from the remainder of the plant in the harvesting process does not mean that it is no longer alive. This is also true of fresh flowers and complete plants, such as "potted" plants. Although transportation of vegetation primarily concerns fresh produce, this patent application is not limited to sweet corn, radishes and the like.

The term "transport containers" is intended to have a wider definition than merely a trailer which is pulled along a highway by truck or tractor. The other common container in commercial use today is a box which may be carried by many means, for example, on the flatbed of a trailer, railcar or ship.

Each of the pallets that form the false floor of my invention, includes a thin, solid, rectangular, horizontal, planar pallet tops supported above the floor by spaced apart, parallel runners attached thereunder parallel to pallet sides of a pallet length. Voids within the pallets extend between the runners, between pallet ends of a pallet width. Parallel slits in the pallet top fluidly connected to the pallet voids extend slightly less than the pallet width and are regularly spaced apart normal to the pallet sides.

The runners have cavities therein extending from the runner bottoms up to fluidly connect with the slits. Drainage ports are located in the runner bottoms adjacent the voids to permit drainage from the cavities.

The false floor is formed by placing the pallets end to end in two adjacent rows on the floor of the container, thereby aligning the voids to form the fluid conduits from one end of the container to the other. The slits are of sufficient size to allow the water sprinkled through the holes in the false ceiling to flow through the slits into the fluid conduits. The fluid conduits also disperse inert gas injected from a plenum through gas ports at the floor at one end of the container, through the slits evenly throughout the container.

The pallets are easily removed from the container and sanitized. After the pallets are removed, the container floor may be easily sanitized, thereby insuring that bacteria, or other contaminants do not remain in the storage container.

Therefore, I have achieved the unusual and surprising results of efficiently and quickly hydro-cooling vegetation within an easily sanitized container and evenly dispersing cold, inert gases therethrough during the hydro-cooling and subsequent transport and storage with my inventive combination of individual elements, such as runners, thin tops, slits, pans, holes, etc. Those skilled in the art will understand the great advantages of a simple, easily maintained and sanitized device according to my invention that facilitates the operation of the hydro-cooling and gas injection processes.

The false ceiling with holes therein also simplifies the structure required to evenly distribute the substantial amounts of chilled water flowed through the container during hydro-cooling. The false ceiling does not require the complicated and expensive piping systems and sprinklers previously required or devised.

Thus it may be seen that the total function of results achieved by my combinations far exceeds the sum of the functions of the individual elements such as plates, slits, sheet metal, holes, plastic, runners, and tops, etc.

(2) Objects of this Invention

An object of this invention is the efficient storage and transportation of vegetation.

Further objects are to achieve the above with a device that is sturdy, compact, durable, lightweight, simple, safe, sanitary, efficient, versatile, ecologically compatible, energy conserving, and reliable, yet inexpensive and easy to manufacture, install, remove, sanitize, operate and maintain.

Other objects are to achieve the above with a method that is versatile, sanitary, ecologically compatible, energy conserving, rapid, efficient, and inexpensive, and does not require highly skilled people to install, remove, sanitize, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENT

Figure 1:
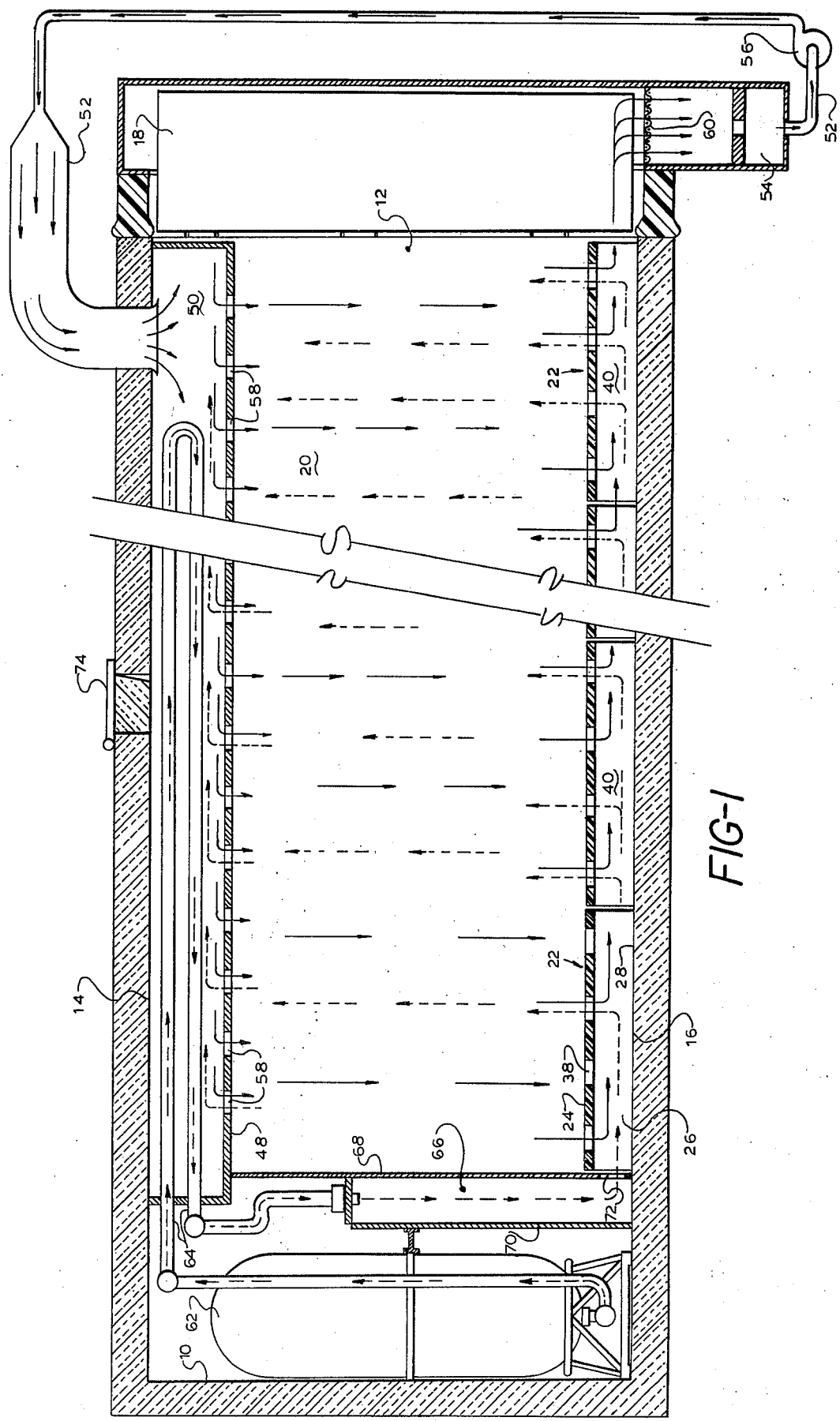
FIG. 1 is a partial, side sectional view of a transport container with a false ceiling and a false floor according to my invention.
Figure 2:
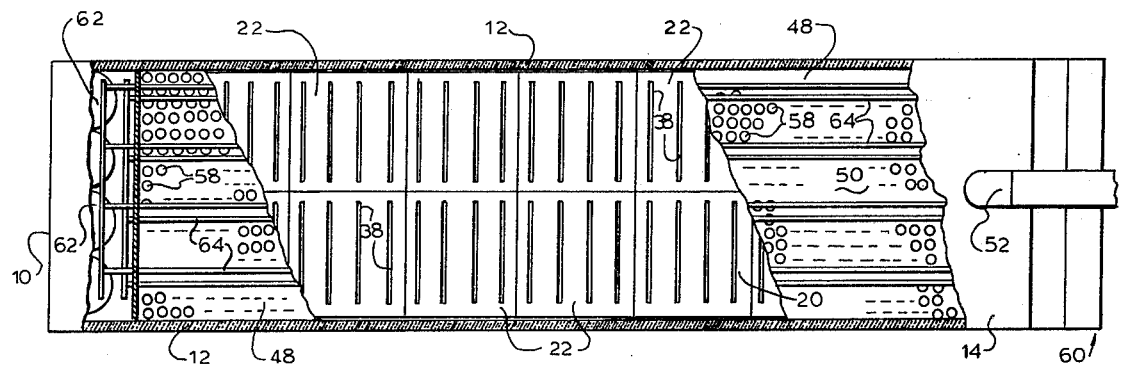
FIG. 2 is a top plan view of the container shown in FIG. 1 with parts broken away to show detail.
Figure 3:
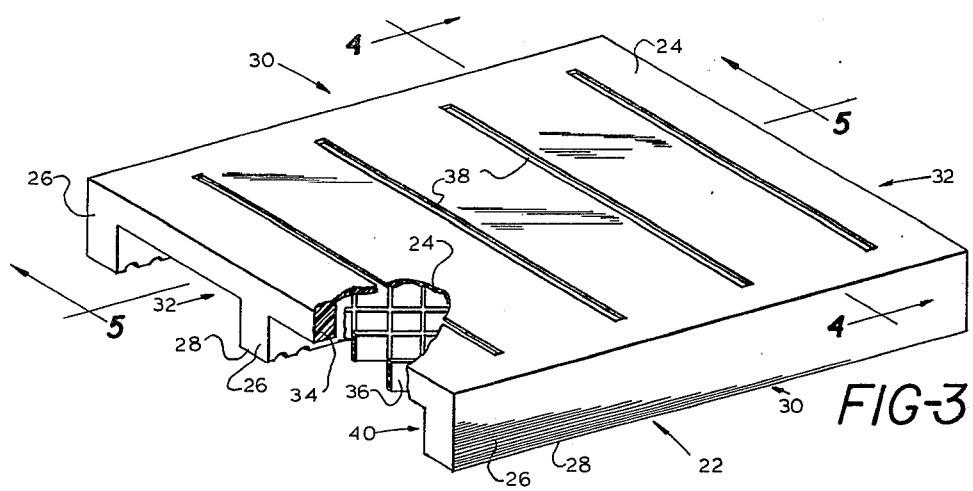
FIG. 3 is a perspective view of a pallet according to my invention.
Figure 4:
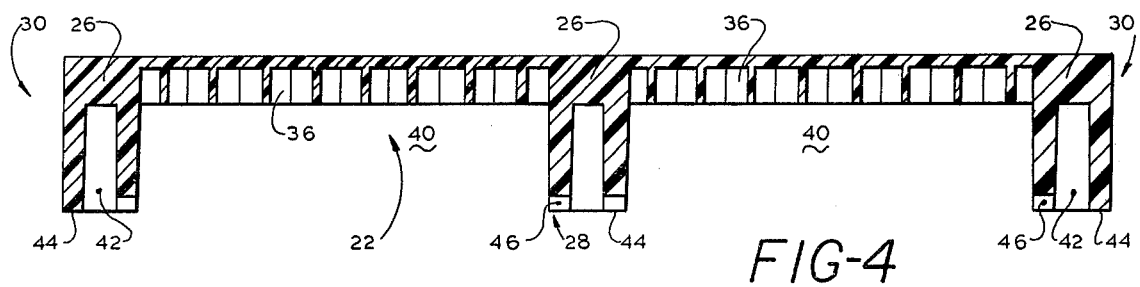
FIG. 4 is an end sectional view taken substantially along line 4—4 of FIG. 3.
Figure 5:
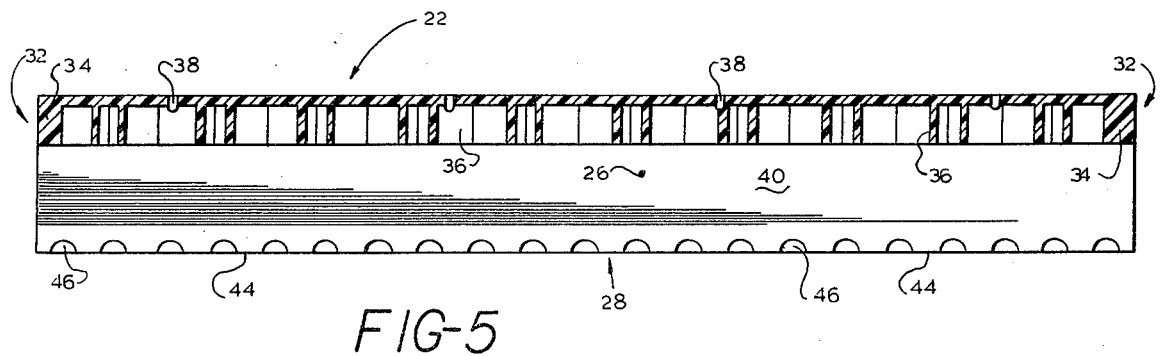
FIG. 5 is a side sectional view taken substantially along line 5—5 of FIG. 3.

FIGS. 1 and 2 show an embodiment of my invention on an insulated transport container or body. It will be understood that my invention is applicable to all commercial transport containers, such as trailers towed by tractor trucks, railroad box cars, and land, sea, or rail piggyback containers. The container includes insulated front wall 10, side walls 12, ceiling 14, and floor 16. Insulated doors 18 are mounted over a door opening at the container rear, and provide for access to container interior 20, enclosed by the doors, walls, ceiling and floor.

A plurality of pallets 22 on the floor 16 within the container, form a false floor above the floor 16. The pallets 22 are preferably a one-piece casting of plastic material because plastic is strong, lightweight, and inexpensive, and the single piece casting is more durable and easily sanitized. It will be understood that although the embodiment illustrated shows a single plastic casting, the various parts described herein may be separately attached or may be attached by welding, bolting, nailing etc. Each pallet 22 includes horizontal, planar, substantially solid pallet top 24 attached to spaced apart, parallel runners 26 thereunder. The runners 26 have bottoms 28 that are adapted to rest on the floor 16. The runners 26 are parallel to pallet sides 30 and normal to pallet ends 32. The pallet ends 32 have a pallet width, preferably 42 inches, and the pallets sides 30 have a pallet length, preferably 44 inches. This pallet size best fits insulated containers adapted for inert gas cooling and hydro-cooling.

End braces 34 at the pallet ends extend between the runners 26 below the pallet top 24. The end braces 34 are spaced above the runner bottoms 28. Horizontal brace webs 36 support the pallet top 24 and extend between the runners 26 and the end braces 34. I prefer to employ an expanded web formed by a lattice work of vertical strips crossed as seen in the drawings so as to provide strong support of the pallet top with a minimum of weight in plastic material.

Slits 38 are located at about 11 inch spacings in the pallet top 24, normal to the runners 26. The slits 38 extend slightly less than the pallet width. The slits 38 are preferably about 174 inch in width and 36 inch in length. Voids 40 extend between the runners 26 and the web 36. The web 36 has spaces or gaps therein that fluidly connect the voids 40 to the slits 38. The voids 40 extend from pallet end to pallet end. As the pallets are positioned on the floor 16 end to end, the voids 40 within the pallets 22 are aligned to form fluid conduits below the false floor.

The runners 26 have tapered runner chambers 42 therein. The chambers 42 are open at the runner bottoms 28 and extend up proximate the pallet top 24. Runner bottom edges 44 extend on either side of the chambers 42 opening within the runner bottom 28. The slits 38 may be fluidly connected to the chambers 42. Therefore, drainage ports 46 in the bottom edges 44 adjacent to the voids 40 permit draining of fluids from within the chambers 42.

Pan 48 suspended from the ceiling 14 forms a false ceiling spaced below the ceiling 14. Ceiling plenum 50 extends between the ceiling 14 and the pan 48. A water pump means in the form of water supply line 52, connecting chilled water supply 54 to the plenum 50 with pump 56 therein, pumps water from the chilled water supply 54 to the plenum 50 at substantial flow rates, preferably about 2,000 gallons per minute. The pan 48 has sprinkler perforations or holes 58 dispersed thereover. The sprinkler holes 58 are sized and spaced so as to provide a substantially equal flow of water over the produce within the shipping container, preferably 5/16 inch diameter holes on 4 inch centers. The false ceiling permits the use of the substantial flow rates required to quickly hydro-cool the vegetation in the container.

After the chilled water is pumped by the pump 56 into the plenum 50, it sprinkles or drains through the holes 58 onto produce or vegetation stacked in bulk or in cartons or other containers on the false floor formed by the pallet 22. As the chilled water drains or flows over the vegetation, the water cools the vegetation. The water then drains through the slits 38 into the voids 40. Water collected in the voids 40 drains through the conduits formed by the aligned voids 40 into drain 60 associated with the container at is rear. The drain 60 recycles the drained water to the chilled water supply after it is filtered and rechilled, as shown schematically in FIG. 1. It will be understood that if it is deemed unnecessary, for the sake of economy, to recycle the drained water, the doors of the trailer may be opened and the water drained out of the open doors of the trailer onto the ground, such that either the trailer doors or the drain may form drain means for draining the water from the fluid conduits. The drain 60 is noted herein to be associated with the container because in operation, the container is preferably abutted against a flexible seal about the entrance of the alcove or vestibule to form a substantially air-tight seal. As shown in the drawings, in the recycle configuration schematically shown, the drain 60 is connected through the water lines and pump to the container at the ceiling 14.

Gas injection means in the form of a liquified inert gas, such as nitrogen, in cryogenic container 62 connected through vaporization tubes 64 to gas plenum 66 between front bulkhead 68 and plenum duct 70 injects cold inert gas into the plenum 66. By inert gas, I mean gas not having a deleterious effect on the vegetation and being oxygen-free. Gas ports 72 in the bulkhead 68 proximate the floor 16 distribute the inert gas to the fluid conduits formed by the aligned voids 40 at the front thereof. The substantially closed or solid pallet tops 24 facilitate the dispersion of the gas substantially evenly throughout the fluid conduits, thereby evenly injecting the gas upward through the slits 38 about and through the vegetation.

Pressure relief valve 74 in the ceiling 14 or "leaks" around the doors and other leaks forms gas relief means for allowing gases in the container to vent therefrom. The valve 74 is shown schematically in the drawings at the top of the container. The preferred valve is a 5 inch by 6 inch flapper held closed by magnetic attraction of the flapper to a magnetic strip attached to the container. The pressure differential required to open the flapper is typically 3 to 5 inches of water.

After the vegetation is hydro-cooled, the doors 18 are closed, the drain 60 and water line 52 disconnected, and the openings closed. Inert gas is periodically injected through the plenum 66, ports 72, voids 40 and slits 38 into the container to maintain the temperature at a desired cold level, and to maintain an oxygen-free atmosphere about the vegetation.

After each shipment, the false floor is easily sanitized by simply removing the separate pallets 22 and transporting them to a place for convenient sanitation. The container interior is also sanitized. When it is desired to ship more vegetation in the container, the pallets are simply placed end to end with the runners extending parallel to the container side walls 12 to form the fluid conduits.

If desired and as appropriate, the pallets may also be used with a forklift to transport vegetation, although experience has shown that it is more desirable to simply unload the produce off of the pallets from within the container.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

10: front wall
12: side walls
14: ceiling
16: floor
18: doors
20: container interior
22: pallets
24: pallet top
26: runners
28: runner bottoms
30: pallet sides
32: pallet ends
34: end braces
36: brace webs
38: slits
40: voids
42: runner chambers
44: runner bottom edges
46: drainage ports
48: pan
50: ceiling plenum
52: water line
54: chilled water supply
56: pump
58: sprinkler holes
60: drain
62: cryogenic container
64: vaporization tubes
66: gas plenum
68: front bulkhead
70: plenum duct
72: gas ports
74: pressure relief valve.

I claim as my invention:

1. An insulated transport container having
   (a) a floor,
   (b) a ceiling,
   (c) walls, and
   (d) at least one door enclosing
   (e) a container interior,
   (f) sprinkler means on the container for sprinking chilled water onto vegetation therein,
   (g) injection means on the container for injecting cold inert gas therein proximate the floor,
   (h) release means on the container for controllably releasing gases from the container interior,
   (j) drain means fluidly associated with the container at the floor for draining the water; wherein the improvement comprises in combination with the above:
   (k) a plurality of pallets on the floor,
   (l) each pallet having
      (i) a substantially solid pallet top,
      (ii) at least two parallel spaced apart runners attached below the pallet top and resting on the floor, (iii) small apertures in the pallet top fluidly connected to
(iv) at least one void between the runners, the floor, and the pallet top extending between pallet ends,
(m) the pallets being aligned end to end in at least one row to form a false floor above the floor with the pallet voids fluidly connected to form at least one fluid conduit below the false floor that is fluidly connected to
  (i) the space above the false floor through the apertures,
  (ii) the injection means, and
  (iii) the drain means.

2. The invention as defined in claim 1 including all of the limitations (a) through (m) with the addition of the following limitations:
(n) said injection means including
  (i) a supply of cold inert gas fluidly connected to a gas plenum behind a bulkhead at an end of the false floor,
  (ii) ports in the bulkhead proximate the floor fluidly connecting the fluid conduits below the false floor to the gas plenum.

3. The invention as defined in claim 1 including all of the limitations (a) through (m) with the addition of the following limitations:
(n) said sprinkler means including
  (i) a false ceiling spaced below the container ceiling,
  (ii) a sprinkler plenum between the false ceiling and the container ceiling,
  (iii) small, spaced apart holes in the false ceiling fluidly connecting the sprinkler plenum to the container interior therebelow, and
  (iv) pump means fluidly connected to the sprinkler plenum for pumping chilled water thereinto.

4. The invention as defined in claim 3 including all of the limitations (a) through (n) with the addition of the following limitations:
(o) said injection means including
  (i) a supply of cold inert gas fluidly connected to a gas plenum behind a bulkhead at an end of the false floor,
  (ii) ports in the bulkhead proximate the floor fluidly connecting the fluid conduits below the false floor to the gas plenum.

5. An insulated transport container having
(a) a floor,
(b) a ceiling,
(c) a front wall,
(d) two side walls, and
(e) at least one rear door, enclosing
(f) a container interior, wherein the improvement comprises in combination with the above:
(g) sprinkler means proximate the ceiling for sprinkling chilled water onto vegetation therein,
(h) injection means on the container for injecting cold, inert gas therein proximate the floor and the front wall,
(j) relief means on the container for controllably releasing gases from the container,
(k) drain means fluidly associated with the container at the floor for draining the water,
(l) a plurality of pallets on the floor, each having
  (i) a horizontal, planar, rectangular, solid top,
  (ii) two sides with a pallet length,
  (iii) two ends with a pallet width,
  (iv) three parallel, spaced apart runners below and attached to the pallet top parallel to the sides,
  (v) an open bottom between the runners,
  (vi) bottoms of the runners resting on the floor,
  (vii) voids between the pallet top and the floor extending between the runners, from pallet end to pallet end,
  (viii) narrow, spaced apart slits in the pallet top fluidly connected to the voids,
(m) the pallets being abutted end to end in two adjacent rows, with the runners and the voids in each row aligned parallel to the container side walls to form a false floor above the floor with four fluid conduits formed by the aligned voids therebelow, with each fluid conduit being fluidly connected to
  (i) the injection means at one end of the conduit,
  (ii) the drain means at another end of the conduit, and
  (iii) the container interior above the false floor through the slits.

6. The invention as defined in claim 5 including all of the limitations (a) through (m) with the addition of the following limitations:
(n) said sprinkler means including
  (i) a false ceiling spaced below the container ceiling,
  (ii) a sprinkler plenum between the false ceiling and the container ceiling,
  (iii) small, spaced apart holes in the false ceiling fluidly connecting the sprinkler plenum to the container interior therebelow, and
  (iv) pump means fluidly connected to the sprinkler plenum for pumping chilled water thereinto.

7. The invention as defined in claim 6 including all of the limitations (a) through (n) with the addition of the following limitations:
(o) said injection means including
  (i) a supply of cold inert gas fluidly connected to a gas plenum behind a bulkhead at an end of the false floor,
  (ii) ports in the bulkhead proximate the floor fluidly connecting the fluid conduits below the false floor to the gas plenum.

8. The invention as defined in claim 7 including all of the limitations (a) through (o) with the addition of the following limitations regarding each pallet:
(p) there being four slits regularly spaced normal to the runners,
(q) each slit being about 174 inches wide and about 36 inches long,
(r) end braces at the pallet ends attached to the pallet top and extending between and attached to the runners,
(s) the end braces being spaced above the open bottom,
(t) a bracing web below and attached to the pallet top, and extending between the runners and the end braces,
(u) the web having gaps therein,
(v) the voids extending between the runners below the web,
(w) the slits being fluidly connected to the voids through the gaps within the web.

9. The invention as defined in claim 8 including all of the limitations (a) through (w) with the addition of the following limitations:
(x) the pallet length being about 44 inches,
(y) the pallet width being about 42 inches, (z) the pallet being a single casting of plastic material.

10. The process involving
(a) vegetation in
(b) an enclosed airtight container having insulated front, side walls, top, floor and door over a door opening, and
(c) said container adapted to be transported from one location to another; wherein said improved method comprises,
(d) loading the vegetation on pallets in the container,
(e) forming conduits between the floor and pallets from the front to the door opening,
(f) flushing the vegetation with cold water from overhead down through the vegetation and out the conduits under the pallets to the door opening, and
(g) flowing inert gas from the front through the conduits under the pallets, up through the vegetation.

11. The invention as defined in claim 10 including all of the limitations (a) through (g) with the addition of the following limitations:
(h) unloading the vegetation from the container,
(j) removing the pallets from the container then
(k) sanitizing the pallets and container interior.

12. A pallet having
(a) a horizontal, planar, rectangular top,
(b) two sides with a pallet length,
(c) two ends with a pallet width,
(d) parallel, spaced apart runners below and attached to the top parallel to the sides,
(e) voids between the runners below the top extending from end to end; wherein the improvement comprises:
(f) the pallet having an open bottom with bottoms of the runners adapted to rest on floors,
(g) the pallet top being substantially solid, with
(h) several narrow, spaced apart slits in the pallet top fluidly connected to the voids,
(j) the pallet length being about 44 inches,
(k) the pallet width being about 42 inches,
(l) there being four slits regularly spaced normal to the runners,
(m) each slit being about ¼ inch wide and about 36 inches long,
(n) end braces at the pallet ends attached to the pallet top and extending between and attached to the runners,
(o) the end braces being spaced above the open bottom,
(p) a bracing web below and attached to the pallet top, and extending between the runners and the end braces,
(q) the web having gaps therein,
(r) the voids extending between the runners below the web,
(s) the slits being fluidly connected to the voids through the gaps within the web.

13. The invention as defined in claim 12 including all of the limitations (a) through (s) with the addition of the following limitations:
(t) the runners having upwardly tapered chambers therein that have openings in the runner bottoms,
(u) bottom edges on either side of the openings in the runner bottoms,
(v) drainage ports in the runner bottom edges adjacent to the pallet voids.

14. The invention as defined in claim 13 including all of the limitations (a) through (v) with the addition of the following limitations:
(w) a plurality of the pallets abutted end to end with the runner bottoms on a floor with the runners and the voids aligned to form a false floor above the floor having
(i) a false floor length approximately equal to the sum of the aligned pallet lengths,
(ii) at least one fluid conduit formed by the aligned voids extending the false floor length below the false floor and fluidly connected to the space above the false floor through the slits.

15. The invention as defined in claim 14 including all of the limitations (a) through (w) with the addition of the following limitation:
(x) the pallet being a single casting of plastic material.

16. A transport container having
(a) a floor,
(b) a ceiling,
(c) walls, and
(d) at least one door, enclosing
(e) a container interior, wherein the improvement comprises in combination with the above:
(f) a plurality of pallets in the container,
(g) each pallet having
(i) a substantially solid pallet top,
(ii) at least two parallel, spaced apart runners attached below the pallet top, having runner bottoms resting on the floor,
(iii) voids between the runners, below the top, and extending between pallet ends,
(iv) an open pallet bottom between the runner bottoms,
(v) several narrow, spaced apart slits in the pallet top fluidly connected to the voids,
(h) the pallets abutted end to end with the runners and the voids aligned, with
(j) the pallet tops forming a false floor above the container floor having a false floor length,
(k) the aligned voids forming fluid conduits extending the false floor length below the false floor, and
(l) the fluid conduits fluidly connected to the container interior above the false floor through the slits.

17. A pallet having
(a) a horizontal, planar, rectangular top,
(b) two sides,
(c) two ends,
(d) parallel, spaced apart runners below and attached to the top parallel the sides,
(e) voids between the runners below the top extending from end to end; wherein the improvement comprises:
(f) the runners having bottoms adapted to rest on floors,
(g) the pallet having an open bottom between the runner bottoms,
(h) the pallet top being substantially solid,
(j) several narrow, spaced apart slits in the pallet top,
(k) end braces at the pallet ends attached to the pallet top and extending between and attached to the runners,
(l) the end braces being spaced above the open bottom,
(m) a bracing web below and attached to the pallet top, and extending between the runners and the end braces,
(n) the web having gap therein,
(o) the voids extending between the runners below the web, and
(p) the slits being fluidly connected to the voids through the gaps within the web.

* * * * *